US008433469B2

(12) United States Patent  (10) Patent No.: US 8,433,469 B2
Harvey et al.  (45) Date of Patent: Apr. 30, 2013

(54) COMMUNICATION TECHNIQUE BY WHICH AN AUTONOMOUS GUIDANCE SYSTEM CONTROLS AN INDUSTRIAL VEHICLE

(75) Inventors: Dean S. Harvey, Cortland, NY (US); Stephen L. Page, Greene, NY (US); Richard M. Day, Port Crane, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 13/406,654

(22) Filed: Feb. 28, 2012

(65) Prior Publication Data
US 2012/0239238 A1 Sep. 20, 2012

Related U.S. Application Data

(60) Provisional application No. 61/454,013, filed on Mar. 18, 2011.

(51) Int. Cl.
G01C 21/34 (2006.01)
(52) U.S. Cl.
USPC ............................................ 701/23; 187/237
(58) Field of Classification Search .................... 701/23; 187/223, 237
See application file for complete search history.

(56) References Cited

U.S. PATENT DOCUMENTS

| 4,942,529 | A  |    | 7/1990  | Avitan et al. |         |
|-----------|----|----|---------|---------------|---------|
| 5,938,710 | A  |    | 8/1999  | Lanza et al.  |         |
| 6,480,768 | B1 |    | 11/2002 | Torii         |         |
| 7,953,526 | B2 |    | 5/2011  | Durkos et al. |         |
| 2006/0089765 | A1 | * | 4/2006 | Pack et al. ........................ | 701/23 |
| 2009/0265059 | A1 | * | 10/2009 | Medwin et al. ................... | 701/33 |
| 2011/0022442 | A1 |   | 1/2011 | Wellman et al. |         |

FOREIGN PATENT DOCUMENTS

| FR | 2594818 | 8/1987 |
| FR | 2925013 | 6/2009 |

OTHER PUBLICATIONS

Siemens; Siemens Develops Autonomous Navigation System for Forklifts; www.industrialit.com.au/news; Dec. 12, 2011.

* cited by examiner

Primary Examiner — Mary Cheung
Assistant Examiner — Yuen Wong
(74) Attorney, Agent, or Firm — Quarles & Brady LLP; George E. Haas

(57) ABSTRACT

A propulsion drive system is operated by a controller to propel an industrial vehicle along a path in an unmanned mode. An autonomous processor module sends commands to the vehicle controller in response to messages received via a communication network from a guidance and navigation system. The guidance and navigation system transmits a message over the communication network, wherein that message contains a first numerical value specifying the velocity and a second numerical value specifying an amount that the propulsion drive system is to turn a wheel of the industrial vehicle. The message also specifies a maximum speed limit and indicators commanding that a load carried by the industrial vehicle be raised and lowered. The autonomous processor module transmits a feedback message indicate actual vehicle operating parameters to the guidance and navigation system.

30 Claims, 5 Drawing Sheets

TPDO1

| BYTE 0 (LOW) | TRACTION THROTTLE RANGE -32768 TO +32767 | |
|---|---|---|
| BYTE 1 (HIGH) | | |
| BYTE 2 (LOW) | AUTONOMOUS OR TRAINING MODES MAXIMUM TRACTION SPEED | |
| BYTE 3 (HIGH) | | |
| BYTE 4 (LOW) | AUTO STEERING REQUEST RANGE -32768 TO +32767 | |
| BYTE 5 (HIGH) | | |
| BYTE 6 | BIT 0 | RAISE LOAD CARRIER COMMAND |
| | BIT 1 | LOWER LOAD CARRIER COMMAND |
| | BIT 2 | ACTIVATE HORN |
| | BIT 3 | UNUSED |
| | BIT 4 | UNUSED |
| | BIT 5 | UNUSED |
| | BIT 6 | CONTROL MODE |
| | BIT 7 | 0=MANUAL,1=AUTONOMOUS,2=TRAINING |
| BYTE 7 | BITS 0-3 | UNUSED |
| | BITS 4-7 | CONTROL VALIDATION |

FIG. 3

TPDO2

| BYTE 0 (LOW) | TRAINING MODE STEERING LIMIT | |
|---|---|---|
| BYTE 1 (HIGH) | | |
| BYTE 2 | AUTO MODE FULL ACCELERATION RATE | |
| BYTE 3 | AUTO MODE LOW ACCELERATION RATE | |
| BYTE 4 | AUTO MODE NEUTRAL DECELERATION RATE | |
| BYTE 5 | AUTO MODE FULL BRAKE RATE | |
| BYTE 6 | AUTO MODE PARTIAL DECELERATION RATE | |
| BYTE 7 | BITS 0-6 | UNUSED |
| | BIT 7 | BIT STUFFING BIT |

FIG. 4

TPDO3

| BYTE 0 (LOW) | ERROR STATUS OF GUIDANCE AND NAVIGATION SYSTEM | |
|---|---|---|
| BYTE 1 (HIGH) | | |
| BYTE 2 | BIT 0 | OBSTRUCTION DETECTED |
| | BIT 1 | UNUSED |
| | BIT 2 | UNUSED |
| | BIT 3 | UNUSED |
| | BIT 4 | UNUSED |
| | BIT 5 | UNUSED |
| | BIT 6 | UNUSED |
| | BIT 7 | UNUSED |
| BYTE 3 | UNUSED | |
| BYTE 4 | UNUSED | |
| BYTE 5 | UNUSED | |
| BYTE 6 | UNUSED | |
| BYTE 7 | BITS 0-6 | UNUSED |
| | BIT 7 | BIT STUFFING BIT |

FIG. 5

RPDO1

| BYTE 0 (LOW) | STEER POSITION | |
|---|---|---|
| BYTE 1 (HIGH) | | |
| BYTE 2 (LOW) | TRACTION MOTOR SPEED | |
| BYTE 3 (HIGH) | | |
| BYTE 4 (LOW) | TRACTION MOTOR CURRENT | |
| BYTE 5 (HIGH) | | |
| BYTE 6 | BATTERY STATE OF CHARGE | |
| BYTE 7 | BIT 0 | CONTROL MODE |
| | BIT 1 | 0=MANUAL,1=AUTONOMOUS, 2=TRAINING |
| | BIT 2 | BRAKE SWITCH INPUT STATE |
| | BIT 3 | AUTONOMOUS MODE ALLOWED |
| | BITS 4-7 | UNUSED |

FIG. 6

RPDO2

| BYTE 0 (LOW) | VEHICLE SERIAL NUMBER |
|---|---|
| BYTE 1 | |
| BYTE 2 (HIGH) | |
| BYTE 3 | MAJOR SOFTWARE REVISION |
| BYTE 4 | MINOR SOFTWARE REVISION |
| BYTE 5 | VEHICLE WHEELBASE |
| BYTE 6 | VEHICLE MAXIMUM LIFT HEIGHT |
| BYTE 7 | VEHICLE MAXIMUM LOAD |

FIG. 7

COMMUNICATION TECHNIQUE BY WHICH AN AUTONOMOUS GUIDANCE SYSTEM CONTROLS AN INDUSTRIAL VEHICLE

CROSS-REFERENCE TO RELATED APPLICATION

This application claims benefit of U.S. provisional patent application No. 61/454,013 filed on Mar. 18, 2011.

STATEMENT CONCERNING FEDERALLY SPONSORED RESEARCH OR DEVELOPMENT

Not applicable.

BACKGROUND OF THE INVENTION

1. Field of the Invention

The present invention relates to industrial vehicles, such as pallet trucks; and more particularly converting a manually operable vehicle for autonomous guided operation.

2. Description of the Related Art

Industrial vehicles of various types, including material handling vehicles, are used to move items inside a factory, a warehouse, a freight transfer station, a store, or other type of facility. Traditionally these industrial vehicles were controlled by an on-board human operator. In order to effectively and efficiently operate a warehouse, for example, it is important to ensure that the equipment and operators are as productive as possible. For a warehouse to compete on the global level, continually improving productivity of industrial vehicle use is vital to reducing costs. To meet these goals, warehouse management systems are frequently employed to control inventory, ensure proper maintenance of equipment, and to monitor operator and equipment efficiency. In these warehouse management systems, a centralized computer system monitors inventory flow, use of the industrial vehicle, vehicle maintenance status, and operator performance.

To provide these functions, data was gathered from each industrial vehicle. In order to gather the data, sensors on the industrial vehicle fed data to a dedicated onboard computer where the data were stored. Occasionally selected data was transferred from the onboard vehicle computer to a central computer system for the facility in which the industrial vehicle operates. The central computer system analyzed the data to determine the performance of each vehicle at the facility and of the different operators. The data analysis also indicated when maintenance and repair of a vehicle was required, Industrial vehicles became more sophisticated and a new category of autonomous guided vehicles has evolved. An autonomous guided vehicle (AGV) is a form of mobile robot that transports goods and materials from one place to another in a constrained environment, such as a factory or a warehouse. Some AGV's followed a wire buried in the floor and thus were limited to traveling along a fixed path defined by that wire. Guidance technology developed further so that the vehicle was not confined to a fixed path. Here reference markers, referred to as fiducials, were placed periodically along various paths that could be traveled by the AGV. In one implementation, each fiducial had unique appearance or optically readable code, e.g. a unique barcode. An AGV was assigned a path defined by a sequence of the fiducials along that path. An optical sensor on the AGV sensed adjacent fiducials as the vehicle travelled and the unique appearance or code of each fiducial enabled the vehicle to determine its present location in the facility and the travel direction along the assigned path.

SUMMARY OF THE INVENTION

An industrial vehicle is capable of operating either only in an unmanned, autonomous mode or also in a manned, manual mode. The present system provides an interface to the conventional control system of the industrial vehicle through which different types of guidance and navigation systems can be connected to autonomously operate the vehicle. The interface employs a predefined protocol for the bidirectional exchange of operating commands and data between the guidance and navigation system and the vehicle control system.

The industrial vehicle includes a guidance and navigation system that in an unmanned, autonomous operating mode produces commands to guide the industrial vehicle along a path. A vehicle controller operates a propulsion drive system that propels the industrial vehicle.

An autonomous processor module is connected to the vehicle controller and is connected via a communication network to the guidance and navigation system. The autonomous processor module receives a first message from the guidance and navigation system that specifies a velocity of the propulsion drive system. The autonomous processor module responds to receiving the first message by instructing the vehicle controller how to operate the propulsion drive system.

In one embodiment, the first message contains a first numerical value specifying velocity for the propulsion drive system and a second numerical value specifying an amount that the propulsion drive system is to turn a wheel of the industrial vehicle. The first may also specify a maximum speed at which the industrial vehicle is permitted to travel in the unmanned, autonomous mode. If the industrial vehicle has an apparatus for raising and lowering a load being transported, the first message contains one indicator commanding that the load be raised and another indicator commanding that the load be lowered.

Another aspect of the invention involves the autonomous processor module transmitting a feedback message that indicates actual vehicle operating parameters to the guidance and navigation system.

BRIEF DESCRIPTION OF THE DRAWINGS

FIGS. 3-5 depict the data formats for three process data objects transmitted in messages from the guidance and navigation system connected to the vehicle controller; and FIGS. 6 and 7 depict the data formats for two process data objects transmitted in messages from the vehicle controller to the guidance and navigation system.

DETAILED DESCRIPTION OF THE INVENTION

The present invention relates generally to the operation of an industrial vehicle. Although the invention is being described in the context of a pallet truck used at a warehouse, the inventive concepts are applicable to other types of industrial vehicles and their use in a variety of facilities, such as a factories, freight transfer stations, warehouses, and stores, for example.

Figure 1:
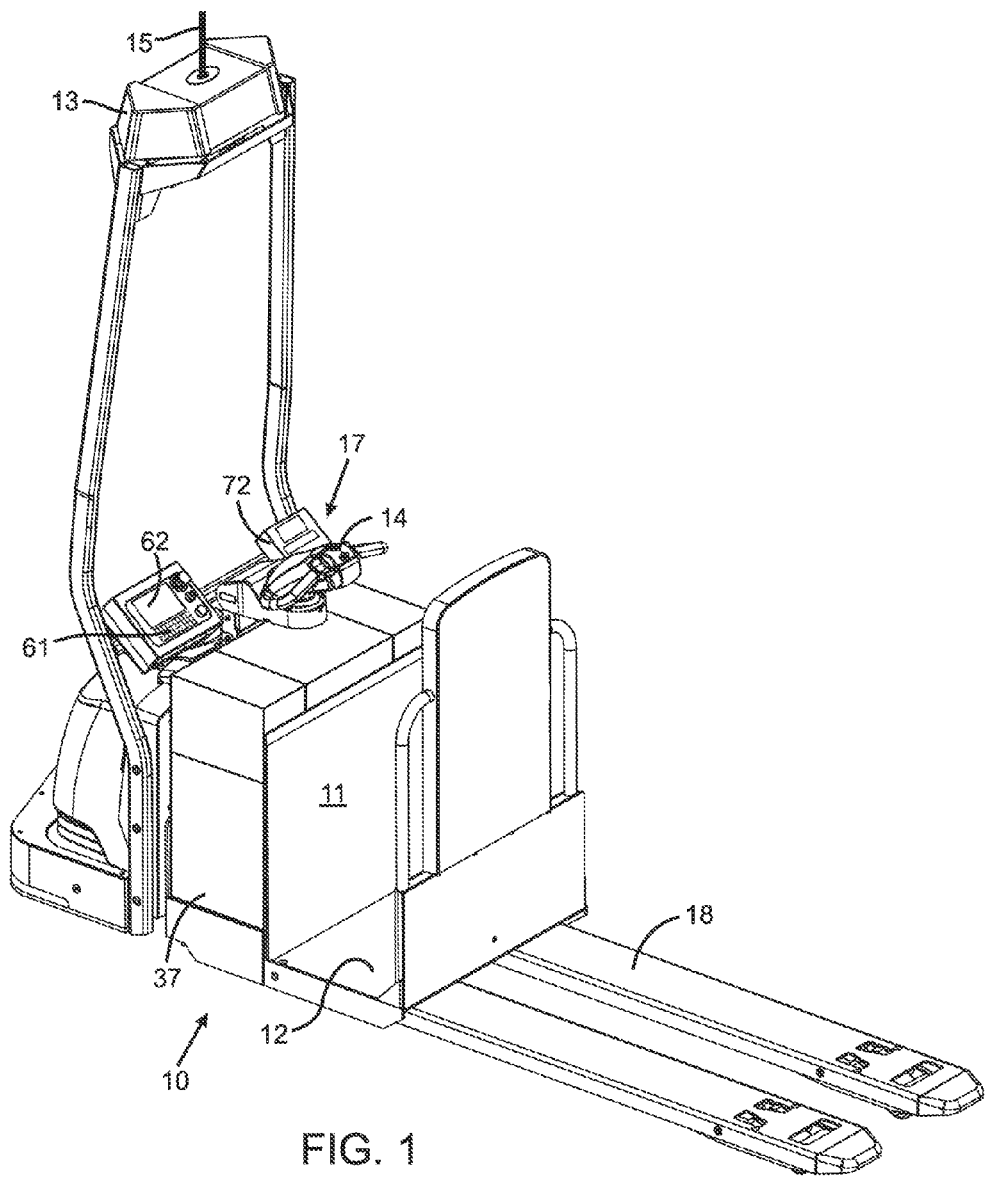
FIG. 1 is a perspective view of an industrial vehicle according to the present invention.

With initial reference to FIG. 1, an industrial vehicle 10, specifically a pallet truck, includes an operator compartment 11 with an opening for entry and exit by the operator. Associated with the operator compartment 11 is a control handle 14 that is one of several operator controls 17. The industrial vehicle 10 has a load carrier 18, such as a pair of forks, that is raised and lowered with respect to the frame of the vehicle. As will be described in further detail, a communication system on the industrial vehicle is able to exchange data and commands via an antenna 15 and a wireless signal with an external warehousing system.

Industrial vehicle 10 further includes a guidance and navigation system (GANS) 13. Any one of several types of guidance and navigation systems may be used to determine a path for the industrial vehicle, sense the vehicle's location and operate the traction, steering and other components to guide the vehicle along the defined path. For example, the GANS 13 can determine its location and the travel path by sensing a buried wire, tape on the building floor, or magnetic markers adjacent the path. Alternatively, the GANS 13 can employ a laser scanner to sense fiducials placed throughout the warehouse to define desired paths. Yet another commercially available GANS 13 has one or more video or still cameras, the output signals from which are processed by image recognition software. A dead reckoning guidance technique also may be utilized. For systems using video cameras or dead reckoning guidance techniques, the industrial vehicle is taught each path by manually driving the vehicle while the GANS 13 "learns" the path.

Thus the industrial vehicle 10 is a hybrid which can be controlled by a human operator who is on-board in the operator compartment 11 or controlled in an unmanned, autonomous mode by the GANS 13.

Figure 2:
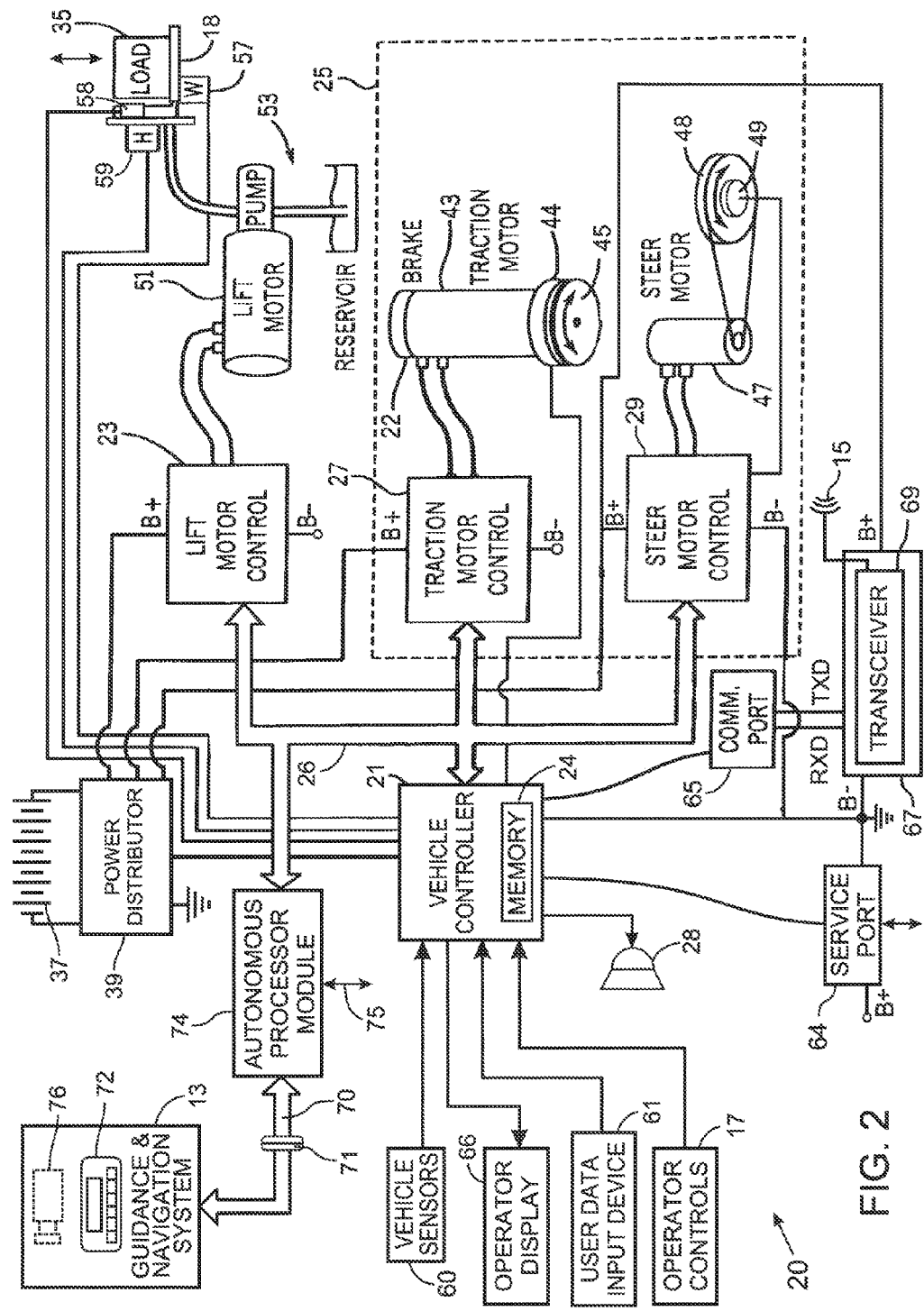
FIG. 2 is a block diagram of a control system of the industrial vehicle in which the control system has a guidance and navigation system connected by a communication link to a vehicle controller.

FIG. 2 is a block diagram of a control system 20 for the industrial vehicle 10. The control system 20 comprises a vehicle controller 21 which is a microcomputer based device that includes memory 24, analog to digital converters, and input/output circuits. The vehicle controller 21 executes a software program that responds to commands from either operator controls 17 or the GANS 13 and operates vehicle components that propel the industrial vehicle and handle loads being transported. The controller's input/output circuits receive operator input signals from the operator controls 17 to activate and govern operation of the vehicle functions, such as forward and backward travel, steering, braking, and raising and lowering the load carrier 18. In response to the operator input control signals, the vehicle controller 21 sends command messages via a first communication network 26 to each of a lift motor control 23 and a propulsion drive system 25 comprising a traction motor control 27 and a steer motor control 29. The propulsion drive system 25 provides a motive force for propelling the industrial vehicle 10 in a selected direction, while the lift motor control 23 drives load carrier 18 to raise or lower a load 35, such goods being warehoused. The first communication network 26 may be any of several types of well-known networks for exchanging commands and data among components of a machine, such as for example the Controller Area Network (CAN) serial bus that uses the communication protocol defined by ISO-11898 promulgated by the International Organization for Standardization in Geneva, Switzerland.

The industrial vehicle 10 is powered by a multiple cell battery 37 that is electrically coupled to the vehicle controller 21, propulsion drive system 25, steer motor control 29, and lift motor control 23 through a bank of fuses or circuit breakers in a power distributor 39.

The traction motor control 27 drives at least one traction motor 43 that is connected to a propulsion wheel 45 to provide motive force to the industrial vehicle. The speed and rotational direction of the traction motor 43 and the associated propulsion wheel 45 are designated by the operator via the operator control handle 14, and are monitored and controlled through feedback derived from a rotation sensor 44. The rotation sensor 44 can be an encoder coupled to the traction motor 43 and the signal therefrom is used to measure the speed and forward and reverse distances that the vehicle travels. The propulsion wheel 45 is also connected to friction brake 22 through the traction motor 43, to provide both a service and parking brake functions for the industrial vehicle 10.

The steer motor control 29 is operably connected to drive a steer motor 47 that turns a steerable wheel 48 in a direction selected by the operator by rotating the control handle 14, described above. The direction and amount of rotation of the steerable wheel 48 determines the angle that the industrial vehicle 10 travels. Another encoder serves as a turn angle sensor 49 that is coupled to the steerable wheel 48 or the steering linkage to sense the angle at which the steerable wheel is turned. Alternatively, the propulsion wheel 45 may be turned to steer the vehicle, in which case the turn angle sensor 49 senses the steering motion of the propulsion wheel.

The lift motor control 23 sends command signals to control a lift motor 51 which is connected to a hydraulic circuit 53 that forms a lift assembly for raising and lowering the load carrier 18. As shown here, a height sensor 59 provides a signal to the vehicle controller 21 indicating the height of the load carrier with respect to the frame of the industrial vehicle 10. Similarly, a weight sensor 57 is provided on the load carrier 18. A load sensor 58 is mounted adjacent the load carrier 18 to obtain an identification of the goods being transported. The load sensor 58, may be, for example, a radio frequency identification (RFID) tag reader, a Rubee™ device that complies with IEEE standard 1902.1, a bar code reader, or other device capable of reading corresponding identifiers on the goods or the pallet that holds the goods. The weight sensor 57 can be used alone to provide a signal that the vehicle controller 21 employs to provide a count of the number of loads that have been transported by the industrial vehicle and maintain a tally of the amount of tonnage that has been moved. For this function the vehicle controller 21 increments the load count each time that the signal from the weight sensor 57 indicates that a load has been placed onto and then removed from the load carrier 18.

Referring still to FIG. 2, a plurality of data input and output devices are connected to the vehicle controller 21, including, for example, vehicle sensors 60 for parameters such as temperature and battery charge level, a user data input device 61, a communication port 65, and a maintenance service port 64. The user data input device 61 allows the vehicle operator, a supervisor, or other personnel to enter data and configuration commands into the vehicle controller 21, and can be implemented as a keyboard, a series of discrete pushbuttons, a mouse, joystick or other input device as will be apparent to those of ordinary skill in the art. The maintenance service port 64 enables a technician to connect a portable computer (not shown) to the industrial vehicle 10 for diagnostic and configuration purposes.

The vehicle controller 21 stores the sensed data regarding the vehicle operation in the memory 24. In addition, the stored data can include information produced by vehicle controller 21, such as the number of hours in operation, battery state of charge, and operational fault codes. Load lifting operations are monitored by deriving the amount of time that the lift motor 51 is active and data from the weight sensor 57 and the height sensor 59. This sensor data also can be used to measure the amount of time that the vehicle is not transporting a load, known as empty load time. Information about the specific load 35 being transported is obtained from the load sensor 58. Various motion parameters, such as speed and acceleration of vehicle travel and of the load carrier 18, also are monitored on the exemplary industrial vehicle 10.

The vehicle controller 21 furnishes some of that data to an operator display 66 which presents information to the vehicle operator. The operator display 66 indicates vehicle operating parameters, such as for example, the speed of travel, battery charge level, hours of operation, time of day, and maintenance needed to be performed. Temperature sensors monitor the temperature of the motors and other components and that data can be displayed. Alert annunciations are presented on the operator display 66 to notify the operator of vehicle conditions requiring attention.

The guidance and navigation system (GANS) 13 produces control signals for operating the lift motor control 23, the traction motor control 27 and the steer motor control 29 to guide the vehicle in the autonomous mode of operation. Specifically the GANS 13 is coupled through a guidance connector 71 to a second communication network 70, such as another CAN serial bus that leads to an autonomous processor module (APM) 74. The APM 74 is connected to the first communication network 26, thereby enabling messages with commands and data to be exchanged with the vehicle controller 21. The APM 74 may have another serial port 75 for connection of a programming device. APM 74 is a microcomputer based device that executes software for controlling the exchange of messages between the GANS 13 and the vehicle controller 21. The APM 74 provides isolation between the first and second communication networks 26 and 70 that prevents inappropriate signals applied to the guidance connector 71 from adversely affecting the transfer of messages over the first communication network. To accomplish this function, the APM 74 inspects each message received via the second communication network 70 to ensure that the message contents are compatible with operation of the industrial vehicle. Only compatible contents are transferred by the APM to the first communication network 26.

The communication port 65 is connected to a wireless communication device 67 that includes a transceiver 69 connected to the antenna 15 for exchanging data and commands via a wireless communication network with vehicle management computer in the warehouse or factory in which the industrial vehicle 10 operates. Any one of several well-known serial communication protocols such as Wi-Fi, can be used to exchange messages and data via that bidirectional communication link. Each industrial vehicle 10 has a unique identifier, such as its manufacturer's serial number or a communication network address, that enables messages to be specifically communicated to that vehicle.

That wireless communication is used by the industrial vehicle to send data about its performance to a central computer in the warehouse. The central computer analyzes the received data to determine how each vehicle is performing in comparison to the other vehicles at the warehouse and in comparison to benchmarks for the particular type of industrial vehicle. The gathering, transmission, and analysis of data regarding the operation and performance of the industrial vehicle and its operator are described in U.S. Published Patent Application No. 2009/0265059 entitled "System for Managing Operation of Industrial Vehicles" which description is incorporated herein by reference. The wireless communication system also conveys instructions to the industrial vehicle. For example when operating in the autonomous mode, a dispatcher in the warehouse can send load carrying tasks to the industrial vehicle. The information can specify a particular path for the industrial vehicle to travel.

The industrial vehicle 10 is a hybrid that at certain times can be controlled by an on-board human operator and at other times can operate autonomously. For example, an operator manually drives the hybrid manned-autonomous industrial vehicle through the warehouse to the appropriate location at which the desired goods are stored and those goods are loaded onto the load carrier 18 of the vehicle. Then the industrial vehicle is manually driven to a first staging area. At the first staging area, the operator employs a user control panel 72 of the GANS 13 to place the industrial vehicle 10 in the autonomous mode and to assign a given path to travel to a second staging area, such as one near the loading dock. Such paths typically are predefined by data stored in the GANS 13 as is standard practice.

For example, some conventional guidance techniques require that the GANS 13 learn each path that subsequently can be taken by the industrial vehicle 10. This learning occurs in a training mode in which the vehicle is manually driven along the particular path, while the GANS 13 stores data about that path. The nature of that data depends upon the type of guidance technique employed and may include identification of the specific fiducials encountered, distances between stops and turns, direction and degrees of the turns, velocity during different path segments, and the like. The detailed path information is gathered by sensors and the vehicle controller and transferred for storage in the GANS. A particular path can be taught to one industrial vehicle 10 and the acquired data then may be transferred to other vehicles of the same type, thereby eliminating the need to manually operate every vehicle over that path in the training mode.

Returning to the example in which the vehicle is at the first staging area and an autonomous mode command and a path assignment have been entered into the user control panel 72 of the GANS 13 shown in FIG. 2. The input device entry is received by the vehicle controller 21 which relays that information through the first communication network 26, the APM 74, and the second communication network 70 to the guidance and navigation system 13. The operator then steps off the industrial vehicle, which action is detected by the pressure sensitive floor mat 12 in the operator compartment 11 (see FIG. 1). This causes the control system 20 to commence the autonomous mode of operation. Thereafter if a person steps onto the pressure sensitive floor mat 12, the control system 20 will automatically transition into the manual operating mode.

In the autonomous mode, the GANS 13 assumes control over operation of the industrial vehicle 10. That control comprises the GANS 13 that transmits operating commands to the vehicle controller 21 directing operation of the lift motor control 23, the traction motor control 27 and the steer motor control 29 in the same manner as occurs in the manual mode when an onboard human operator manipulates the operator controls 17. For example, the GANS 13 generates a velocity command that specifies the direction and speed that the traction motor 43 is to drive the propulsion wheel 45. That operating command is carried by a message that is sent via the second communication network 70 to the APM 74. Upon receipt, the APM reformats the message into one addressed to the vehicle controller 21 and then sends the reformatted message over the first communication network 26.

Upon receiving the reformatted message, the vehicle controller 21 extracts the operating command and uses that information to control operation of the industrial vehicle 10, just as though the vehicle controller had received a similar command produced in response to the operator controls 17 in the manual mode. The vehicle controller 21, however, first inspects the operating command to ensure that the specified operation is appropriate for controlling the industrial vehicle 10 at that time. This inspection filters the operating command and control data sent by the GANS 13 to inhibit inconsistent and imprudent vehicle operations from occurring. For example, the vehicle controller 21 can inhibit a command from the GANS 13 that the traction motor control 27 be operated to propel the vehicle at full speed when the load carrier 18 is raised high with a heavy load. If the message from the APM 74 contains a proper operating command, the vehicle controller 21 formulates a control command for the motor controls 23, 27, or 29 that is associated with the respective vehicle function. For instance, the vehicle controller 21 responds to a velocity command from the APM by issuing a control command to the traction motor control 27 and sends that control command in a message over the first communication network 26. The traction motor control 27 responds to the receipt of that control command by activating the traction motor 43 in the directed manner.

In a similar manner, the GANS 13 sends an operating command to the vehicle controller 21 requesting that the steer motor control 29 turn the steerable wheel 48 a specified amount in a designated direction so that the vehicle 10 travels along the assigned path. Likewise in the autonomous mode, operating commands are sent by the GANS 13 for controlling the lift motor control 23 and other components on the industrial vehicle 10. As the industrial vehicle 10 travels in the autonomous mode, sensors on the GANS 13 detect the position of the vehicle relative to the assigned path. In one type of GANS, video cameras 76 or laser scanners detect fiducials that are placed periodically along different paths in the warehouse. The fiducials may be placed on the warehouse floor, walls, pillars, and shelves. Each fiducial has a unique appearance or an optically readable code, e.g., a unique barcode, thereby enabling the GANS 13 to determine the present position of the vehicle and the direction to take to reach the next fiducial along the assigned path. This information allows the GANS 13 to ascertain when and how to turn the steerable wheel 48 so that the industrial vehicle travels along the assigned path. Other guidance techniques may be used by the GANS 13, such as tracking a buried wire, tape on the floor, or magnetic markers along the path or by using image recognition software to identify physical features of the warehouse along the assigned path.

If the GANS 13 is able to operate the load carrier 18, raise and lower operating commands are sent instructing the vehicle controller 21 to generate appropriate control commands instructing the lift motor control 23 to activate the lift motor 51. Those control commands produced in response to the GANS are identical to control commands that the lift motor control receives in response to an onboard human operator manipulating the operator controls 17 in the manual mode. While the load carrier 18 is raising or lowering, the load carrier height sensor 59 sends feedback signals that assist the vehicle controller 21 in operating the lift motor control 23.

The autonomous processor module 74 and the second communication network 70 enable different types of guidance and navigation systems 13 to be used with the industrial vehicle 10 and its control system 20. Such guidance and navigation systems 13 can use any of several conventional guidance techniques, as long as they provide the command requests in the proper format to the APM 74 for instructing the vehicle controller 21 how to operate the motors and other components of the control system 20.

The first and second communication networks 26 and 70 utilize a serial bus protocol for transmitting messages carrying operating commands. Each message, commonly referred to as a process data object (PDO), contains eight bytes of data, for example that are employed as the operating commands. One set of process data objects, referred to as Transmit Process Data Objects (TPDO's), is used for messages sent from the GANS 13 to the APM 74. Another set of process data objects, referred to as Receive Process Data Objects (RPDO's), is defined for messages sent from the APM 74 to the GANS 13. The terms "transmit" and "receive" denote the direction of the message relative to the GANS. Similar process data objects form messages over the first communication network 26 between the APM 74 and the vehicle controller 21 and between the vehicle controller and the motor controls 23, 27 and 29.

FIGS. 3-7 depict the message data structures of the process data objects sent between the GANS 13 and the APM 74. With reference to FIG. 3, a first transmit process data object (TPDO1) is sent from the GANS 13 to the APM 74 every 20 milliseconds, for example. Bytes 0 and 1 of the TPDO1 provide a signed number that serves as an operating command that indicates a requested velocity for the vehicle, i.e., the traction throttle setting. The sign of this number designates the direction, forward or reverse, and the numerical value indicates a requested speed in that direction. This numerical value is similar to the throttle setting produced by the vehicle controller 21 in the manual operating mode. The next pair of bytes define the maximum speed at which the vehicle is permitted to operate in the autonomous and training modes. Therefore, if the first two bytes indicate a throttle setting in excess of this limit, the APM 74 restricts the speed the level specified in bytes 2 and 3. Upon the TPDO1 bytes being relayed to the vehicle controller 21, the first four bytes are used by that latter device to formulate a velocity and direction command that is then sent over the first communication network 26 to the traction motor control 27. The traction motor control 27 responds to the velocity command by operating the traction motor 43 and the brake 22 accordingly.

Bytes 4 and 5 in TPDO1 convey a signed number that defines the amount that the steer motor control 29 is to turn the steerable wheel 48. The sign of this numerical value determines the direction, left or right, of the steering and the numerical value determines the amount that the wheels turn. This numerical value is the same as the steering command produced by the vehicle controller 21 in the manual operating mode. Upon receiving the TPDO1 bytes relayed by the APM 74, the vehicle controller 21 uses bytes 4 and 5 to formulate a steering command that is sent over the first communication network 26 to the steer motor control 29. The steer motor control 29 responds to the steering command by operating the steer motor 47 accordingly.

The individual bits of byte 6 in TPDO1 serve as flags that designate the operation of specific functions and components on the industrial vehicle 10. Bit 0 is a lift command that when true indicates that the lift motor 51 should be activated to raise the load carrier 18. Bit 1 being true designates that the lift motor 51 should be activated to lower the load carrier 18. The lift and lower bits designate operation of the load carrier at a single predefined speed. The logic level of bits 0 and 1 cause the vehicle controller 21 to create a command that then is sent over the first communication network 26 to the lift motor control 23 which responds by operating the lift motor 51 accordingly. Bit 2 of byte 6 is used to activate the horn 28 on the industrial vehicle 10 to warn people in the vicinity of the vehicle or to summon supervisory personnel. Bits 6 and 7 of byte 6 designate the control mode for the industrial vehicle 10 among manual, autonomous, and training modes. Bits 2-5 are reserved for future use.

During the autonomous mode, bits 4-7 of byte 7 in the TPDO1 convey a numerical value that changes with each TPDO1 message, thereby indicating to the APM 74 that the GANS 13 is operational and is not stuck in a state in which the same data are being transmitted repeatedly. If in the autonomous mode, the APM 74 fails to receive a TPDO1 within a predefined period of time (e.g. 100 ms) since receiving a previous TPDO1 or receives two consecutive TPDO1's with the same value in bits 4-7 of byte 7, the APM signals the vehicle controller 21 stop the industrial vehicle and terminate any other operations that are controlled by the GANS 13.

With reference to FIG. 4, about every second for example, the GANS 13 also transmits another message referred to as a second process data object TPDO2. The TPDO2 contains information for configuring operation of the traction motor control 27 when the vehicle is in the training or autonomous modes. The first two bytes of TPDO2 provide a steering limit that prevents the operator from steering the vehicle into overly aggressive angles during the training mode. The vehicle controller 21 use this numerical value to restrict the amount that the steerable wheel 48 can be turned either left or right in that mode of operation.

Byte 2 of TPDO2 specifies a full acceleration rate for the autonomous mode. This acceleration rate is used when the traction motor 43 is requested by the GANS 13 to transition from a relatively slow speed, as defined by a low throttle percentage, to full speed. Byte 3 provides a similar low acceleration rate for transitions from a low throttle setting to a higher throttle setting that is less than 100% full speed. Byte 4 of TPDO2 is a neutral deceleration rate for the autonomous mode which defines the rate at which the vehicle is allowed decelerate when the throttle request (bytes 0 and 1 of TPDO1) from the GANS is set to zero. Byte 5 specifies the rate of braking that occurs in the autonomous mode when the GANS throttle request designates a reversal of direction or when the GANS request activation of the brake 22. Byte 6 specifies a partial deceleration rate in the autonomous mode which is used to slow the vehicle when going from a higher throttle setting to a lower throttle setting command. The APM 74 passes the PDO's received from the GANS 13 to the vehicle controller 21 which uses these acceleration and deceleration rates when converting velocity change requests from the GANS into velocity commands for the traction motor control 27. That is, the vehicle controller 21 gradually increases the motor velocity commands so that the acceleration or deceleration rate is not exceeded. These specified rates prevent the industrial vehicle 10 from accelerating or decelerating at too rapid a rate.

In byte 7 of TPDO2, only bit 7 is used as a stuffing bit that toggles on each successive transmission of the TPDO2. This enables the APM 74 to detect if the identical message is transmitted repeatedly by the GANS 13.

In addition to the speed, acceleration and steering limits provided in the transmit process data objects, similar limits stored in the vehicle controller 21 also will be observed, with the more restrictive limit taking precedence.

Another message, designated as the third transmit process data object TPDO3, is sent by the GANS 13 about once every second and provides information to the APM 74 and the vehicle controller 21 about faults detected by the GANS. As shown in FIG. 5, the bits of bytes 0 and 1 in TPDO3 indicate the occurrence of various faults in the operation of the GANS 13. Only bit 0 of byte 2 is used in the present implementation and serves as a flag indicating when an obstruction is detected in the path of the industrial vehicle 10. This bit causes the APM 74 to send an obstruction detected message to the vehicle controller 21, which relays that message via a wireless communication network to a vehicle management computer in the warehouse. This alerts the warehouse supervisory personnel of an object obstructing operation of this industrial vehicle so that corrective measures can be taken.

Bytes 3-6 of TPDO3 are not used in the current implementation. Only bit 7 of byte 7 is used for bit stuffing and toggles on each successive transmission of the TPDO3. This bit enables the APM 74 to detect if the identical message is transmitted repeatedly by the GANS 13.

The autonomous processor module 74 is able to send messages over the second communication network 70 to the GANS 13. Such messages feedback data to the GANS 13 regarding specific operating parameters and conditions of the industrial vehicle 10. Some of that data inform the GANS about the vehicle's responses to the operating requests sent by the GANS. These messages contain receive process data objects (RPDO's), which are so designated as being received by the GANS 13.

The first receive process data object (RPDO1) is transmitted by the APM 74 approximately every 20 milliseconds. As depicted in FIG. 6, bytes 0 and 1 contain a signed numerical value that indicates the actual steer position of the steerable wheel 48 as set by the steer motor 47. The sign of this numerical value designates whether a left or right turn is occurring and the numerical magnitude indicates the amount, or degrees, of that turn. Bytes 2 and 3 of RPDO1 form a signed number that denotes the actual traction motor velocity with the sign number indicating the travel direction, forward or reverse. Bytes 4 and 5 provide a numerical value corresponding to traction motor current in amperes.

Byte 6 of RPDO1 indicates the battery state of charge in a percent range from 0 to 100. The vehicle controller 21 receives power data from the power distributor 39 and employs that data to determine the battery state of charge using any one of several well known techniques. The information then is supplied to the APM 74. The bits of byte 7 indicate various operational parameters. Bits 0 and 1 provide a numerical designation of the control mode in which the vehicle controller 21 is actually operating. These modes consist of manual, autonomous, and training The GANS 13 responds to receiving this pair of bits by automatically configuring its mode of operation accordingly. Bit 2 of byte 7 indicates the state of the brake switch. Bit 3 indicates the whether the industrial vehicle may be placed into the autonomous mode. If this bit is set to 0, the industrial vehicle 10 is inhibited from entering the autonomous mode when commanded by the GANS 13. The remaining bits of byte 7 are unused.

Referring to FIG. 7, the APM 74 also transmits a second receive process data object (RPDO2) approximately every second to the GANS 13. This process data object provides vehicle identification and specification data. The first three bytes contain the serial number of the particular industrial vehicle 10. The byte 3 indicates the latest installed major revision of the software for the vehicle controller 21, and byte 4 designates the latest installed minor software revision of the vehicle controller software. Byte 5 indicates the wheelbase of the industrial vehicle in inches. Bit 6 specifies the vehicle's maximum lift height in inches and byte 7 of RPDO2 indicates the maximum lifting load for the vehicle.

The foregoing description was primarily directed to one or more embodiments of the invention. Although some attention has been given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A guidance and navigation system for operating an industrial vehicle in an unmanned/autonomous mode, wherein the industrial vehicle includes a vehicle controller connected by first communication network to a propulsion drive system which propels the industrial vehicle and includes an autonomous processor module connected to send messages over the first communication network and connected to a second communication network; and
  wherein the guidance and navigation system being operative to determine a path to be taken and guides the industrial vehicle along that path by sending a first message to the autonomous processor module via that second communication network, in which the first message contains a first value specifying a velocity for the propulsion drive system and a second value specifying an amount that the propulsion drive system is to turn a wheel of the industrial vehicle, the first message causes the autonomous processor module to inspect the first and second values and if found compatible with operation of the industrial vehicle, the autonomous processor module sends the first and second values in a reformatted message via the first communication network to the vehicle controller, which results in the vehicle controller using the first and second values to send at least one operating command to the propulsion drive system.

2. The guidance and navigation system as recited in claim 1 wherein the first message also specifies a maximum speed at which the industrial vehicle is permitted to travel in the unmanned/autonomous mode.

3. The guidance and navigation system as recited in claim 1 wherein the industrial vehicle has an apparatus for raising and lowering a load being carried, and the first message further contains one indicator designating that the load be raised and another indicator designating that the load be lowered.

4. The guidance and navigation system as recited in claim 1 wherein the first message, sent by the guidance and navigation system, contains an indicator indicating whether the industrial vehicle is operating in the unmanned/autonomous mode or a manned/manual mode.

5. The guidance and navigation system as recited in claim 1 wherein the first message contains a value that changes each successive time the autonomous processor module sends that type of message over the second communication network.

6. The guidance and navigation system as recited in claim 1 wherein the guidance and navigation system sends a second message via the second communication network that specifies limits for a steering angle of the wheel, a vehicle propulsion acceleration rate, a vehicle propulsion deceleration rate, and a braking rate.

7. The guidance and navigation system as recited in claim 1 wherein the guidance and navigation system sends a third message via the second communication network that specifies whether the industrial vehicle encountered an obstacle in its path.

8. The guidance and navigation system as recited in claim 1 wherein the guidance and navigation system receives a feedback message via the second communication network, wherein the feedback message indicates an actual velocity of the industrial vehicle.

9. The guidance and navigation system as recited in claim 1 wherein the guidance and navigation system receives a feedback message via the second communication network, wherein the feedback message indicates an actual velocity of the industrial vehicle, an amount that a wheel is turned to steer the industrial vehicle, a state of charge of a battery, and a state of a brake.

10. The guidance and navigation system as recited in claim 1 wherein the guidance and navigation system receives a feedback message via the second communication network, wherein the feedback message indicates operation in one of the unmanned/autonomous mode, a manned/manual mode, or a training mode.

11. A method for controlling an industrial vehicle in an unmanned/autonomous mode, wherein the industrial vehicle includes a propulsion drive system that is operated by a vehicle controller to propel the industrial vehicle along a path, and an autonomous processor module operatively connected to send commands to the vehicle controller in response to messages received via a communication network, the method comprising:
  a guidance and navigation system determining a path to be taken by the industrial vehicle;
  in response to the path, the guidance and navigation system transmitting a first message over the communication network to the autonomous processor module, wherein the first message contains a first value specifying velocity for the propulsion drive system and a second value specifying an amount that the propulsion drive system is to turn a wheel of the industrial vehicle;
  the autonomous processor module inspecting the first and second values, and if found compatible with operation of the industrial vehicle, the first and second values are sent in a reformatted message to the vehicle controller; and
  the vehicle controller responding to the reformatted message by controlling operation of the propulsion drive system.

12. The method as recited in claim 11 wherein the first message also specifies a maximum speed at which the industrial vehicle is permitted to travel in the unmanned/autonomous mode.

13. The method as recited in claim 11 wherein the industrial vehicle has an apparatus for raising and lowering a load being carried, and the first message further contains one indicator designating that the load be raised and another indicator designating that the load be lowered.

14. The method as recited in claim 11 wherein the first message contains an indicator designating whether the industrial vehicle is operating in the unmanned/autonomous mode or a manned/manual mode.

15. The method as recited in claim 11 wherein the first message contains a numerical value that is changed by the guidance and navigation system each time that type of message is sent over the communication network.

16. The method as recited in claim 11 further comprising the guidance and navigation system transmitting a second message over the communication network, wherein the second message specifies limits for a steering angle of a vehicle wheel, a vehicle propulsion acceleration rate, a vehicle propulsion deceleration rate, and a braking rate.

17. The method as recited in claim 11 further comprising the guidance and navigation system transmitting a third message over the communication network, wherein the third message specifies whether the industrial vehicle encountered an obstacle in its path while operating in the unmanned/autonomous mode.

18. The method as recited in claim 11 wherein guidance and navigation system receives a feedback message from the autonomous processor module, wherein the feedback message indicates an actual velocity of the industrial vehicle.

19. The method as recited in claim 11 wherein guidance and navigation system receives a feedback message from the autonomous processor module, wherein the feedback message indicates an actual velocity of the industrial vehicle, an amount that a wheel is turned to steer the industrial vehicle, a state of charge of a battery, and a state of a brake.

20. The method as recited in claim 11 wherein guidance and navigation system receives a feedback message from the autonomous processor module, indicating operation in one of the unmanned/autonomous mode, a manned/manual mode, or a training mode.

21. An industrial vehicle comprising:
a propulsion drive system for propelling the industrial vehicle;
a vehicle controller for operating the propulsion drive system;
a first communication network through which the vehicle controller and the propulsion drive system exchange messages;
a second communication network;
an autonomous processor module connecting the first communication network to the second communication network; and
a guidance and navigation system comprising a sensor for detecting a present location of the industrial vehicle and in an unmanned/autonomous operating mode determines a path to be taken and produces commands to guide the industrial vehicle along the path, and being operative to send a first message via the second communication network to the autonomous processor module, wherein the first message contains a first value specifying a velocity for the propulsion drive system and a second value specifying an amount that the propulsion drive system is to turn a wheel of the industrial vehicle;
wherein the autonomous processor module inspects the first and second values and transfers only those first and second values that are compatible with operation of the industrial vehicle to the vehicle controller via the first communication network.

22. The industrial vehicle as recited in claim 21 wherein the first message also specifies a maximum speed at which the industrial vehicle is permitted to travel in the unmanned/autonomous mode.

23. The industrial vehicle as recited in claim 21 wherein the industrial vehicle has an apparatus for raising and lowering a load being carried, and the first message contains one indicator designating that the load be raised and contains another indicator designating that the load be lowered.

24. The industrial vehicle as recited in claim 21 wherein the first message contains an indicator designating whether the industrial vehicle is operating in the unmanned/autonomous mode or a manned/manual mode.

25. The industrial vehicle as recited in claim 21 wherein the first message contains a value that changes each time that type of message is sent over the second communication network.

26. The industrial vehicle as recited in claim 21 wherein the guidance and navigation system sends a second message to the autonomous processor module that specifies limits for a steering angle of a vehicle wheel, a vehicle propulsion acceleration rate, a vehicle propulsion deceleration rate, and a braking rate.

27. The industrial vehicle as recited in claim 21 wherein the guidance and navigation system sends a third message to the autonomous processor module that specifies whether the industrial vehicle encountered an obstacle in its path while operating in the unmanned, autonomous mode.

28. The industrial vehicle as recited in claim 21 wherein the autonomous processor module sends a feedback message to the guidance and navigation system, wherein the feedback message indicates an actual velocity of the industrial vehicle.

29. The industrial vehicle as recited in claim 21 wherein the autonomous processor module sends a feedback message to the guidance and navigation system wherein the feedback message indicates an actual velocity of the industrial vehicle, an amount that a wheel is turned to steer the industrial vehicle, a state of charge of a battery, and a state of a brake.

30. The industrial vehicle as recited in claim 21 wherein the autonomous processor module sends a feedback message to the guidance and navigation system indicating operation in one of the unmanned, autonomous mode, a manned, manual mode, or a training mode.

* * * * *